United States Patent
Bariant et al.

(10) Patent No.: US 12,436,248 B2
(45) Date of Patent: Oct. 7, 2025

(54) IDENTIFYING INTERFERENCE IN RECEIVED ECHO SIGNALS FROM A GROUP OF SENSORS

(71) Applicant: Valeo Schalter und Sensoren GmbH, Bietigheim-Bissingen (DE)

(72) Inventors: Jean Francois Bariant, Bietigheim-Bissingen (DE); Anto Joys Yesuadimai Michael, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 183 days.

(21) Appl. No.: 18/276,495

(22) PCT Filed: Feb. 9, 2022

(86) PCT No.: PCT/EP2022/053053
§ 371 (c)(1),
(2) Date: Aug. 9, 2023

(87) PCT Pub. No.: WO2022/171641
PCT Pub. Date: Aug. 18, 2022

(65) Prior Publication Data
US 2024/0310499 A1    Sep. 19, 2024

(30) Foreign Application Priority Data
Feb. 10, 2021   (DE) .................. 10 2021 103 058

(51) Int. Cl.
*G01S 7/527*   (2006.01)
*G01S 7/52*   (2006.01)
(Continued)

(52) U.S. Cl.
CPC .......... *G01S 7/527* (2013.01); *G01S 7/52004* (2013.01); *G01S 15/104* (2013.01); *G01S 15/931* (2013.01)

(58) Field of Classification Search
CPC ........ G01S 13/87; G01S 13/931; G01S 7/527; G01S 7/524; G01S 7/003; G01S 15/104;
(Continued)

(56) References Cited

U.S. PATENT DOCUMENTS

| | | | |
|---|---|---|---|
| 11,834,064 B2 * | 12/2023 | Tournabien | G01S 1/72 |
| 2007/0008819 A1 * | 1/2007 | Diessner | G01S 7/52004 367/99 |
| 2022/0043134 A1 * | 2/2022 | Dworakowski | G01S 13/87 |

FOREIGN PATENT DOCUMENTS

| | | |
|---|---|---|
| CN | 104330480 A | 2/2015 |
| CN | 110967674 A | 4/2020 |

(Continued)

OTHER PUBLICATIONS

International Search Report and Written Opinion in corresponding International Application No. PCT/EP2022/053053, dated Jun. 20, 2022 (16 pages).

(Continued)

*Primary Examiner* — Daniel L Murphy
*Assistant Examiner* — Jamie M Ndure
(74) *Attorney, Agent, or Firm* — Osha Bergman Watanabe & Burton LLP

(57) ABSTRACT

The invention relates to a method for operating a sensor arrangement (12) having a control unit (14) and a plurality of sensors (16) which are arranged in at least one group (18, 20), wherein the sensors (16) are connected to a common electrical supply, in particular via the control unit (14), comprising the steps of using the sensors (16) to emit sensor signals, wherein the sensors (16) in each group (18, 20) emit (Continued)

Figure 1:
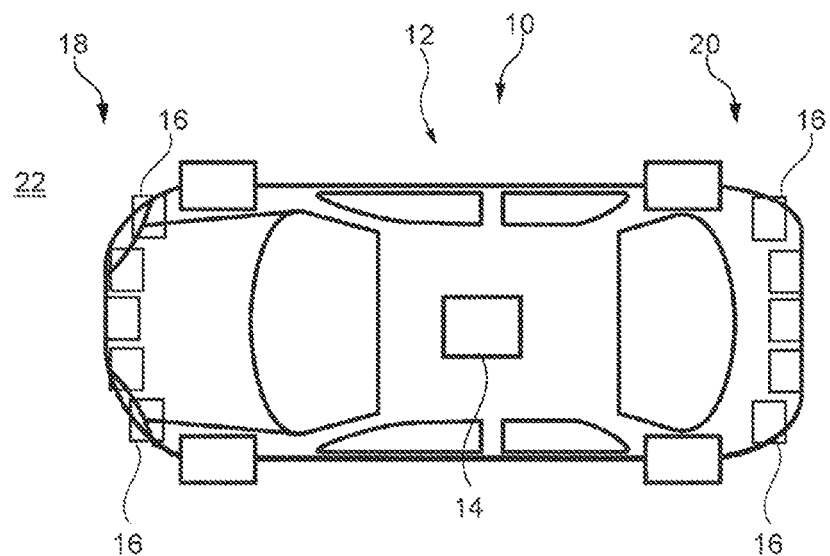

the sensor signals thereof in the particular group transmission phase thereof, receiving echo signals on the basis of reflections of the sensor signals, transmitting the received echo signals from the sensors (16) to the control unit (14), and identifying interference (38) in the received echo signals from the at least one group (18, 20) on the basis of a comparison of at least two of the received echo signals from the corresponding group (18, 20). The invention also relates to a corresponding sensor arrangement (12) for a vehicle (10) for operation according to the above method. The invention also relates to a driving assistance system for a vehicle (10) having a sensor arrangement (12) as described above.

22 Claims, 5 Drawing Sheets

(51) Int. Cl.
 *G01S 15/10* (2006.01)
 *G01S 15/931* (2020.01)
(58) Field of Classification Search
 CPC .... G01S 17/931; G01S 7/52004; G01S 15/87; G01S 15/931; G01S 2013/9324; G01S 2013/9316; G01S 2013/9323
 See application file for complete search history.

(56) References Cited

FOREIGN PATENT DOCUMENTS

| | | |
|---|---|---|
| DE | 19737868 A1 | 3/1998 |
| DE | 10347364 A1 | 5/2005 |
| DE | 102007045561 A1 | 4/2009 |
| DE | 102009003257 A1 | 11/2010 |
| DE | 102018117516 B3 | 11/2019 |
| KR | 20190093637 A | 8/2019 |
| KR | 20200126073 A | 11/2020 |

OTHER PUBLICATIONS

German Search Report in corresponding German Application No. 10 2021 103 058.7, dated Jan. 19, 2022 (8 pages).
Notice of Preliminary Rejection in corresponding Korean Application No. 2023-7030849, dated Jul. 9, 2025 (14 pages).

\* cited by examiner

IDENTIFYING INTERFERENCE IN RECEIVED ECHO SIGNALS FROM A GROUP OF SENSORS

The present invention relates to a method for operating a sensor arrangement having a control unit and a plurality of sensors, which are arranged in at least one group, wherein the sensors are connected to a common electrical supply, in particular via the control unit.

The present invention also relates to a method for operating a sensor arrangement having a control unit and a plurality of sensors, which are arranged in at least two groups, wherein the sensors are connected to a common electrical supply, in particular via the control unit.

The present invention also relates to a sensor arrangement for a vehicle having a control unit and a plurality of sensors arranged in at least one group, wherein the sensors are connected to a common electrical supply, in particular via the control unit, and the sensor arrangement is designed for operation using the above method.

The present invention further relates to a sensor arrangement for a vehicle, having a control unit and a plurality of sensors, which are arranged in at least two sub-groups, wherein the sensors are connected to a common electrical supply, in particular via the control unit.

The present invention also relates to a driving assistance system for a vehicle having an above-mentioned sensor arrangement.

Current vehicles increasingly have sensors installed to monitor an environment around the vehicle. These sensors, hereafter also referred to as ambient sensors, provide environmental information that can be used, for example, by various driving assistance systems belonging to the vehicle. The driving assistance systems may assist a driver of the relevant vehicle, or provide functions for implementing autonomous driving, depending on the type of driver assistance system.

In a sensor unit, the sensors are often connected to a common electrical supply. For this purpose, for example, the sensors are connected to a control unit via a supply line, which not only supplies the ambient sensors with electrical power, but also receives and evaluates sensor information from the sensors in order to detect objects in the environment that pose a danger to the vehicle and to generate corresponding warnings. The sensor information may include echo signals received as reflections of sensor signals emitted by the sensors. For example, the echo signals contain a time of a first echo from objects in the environment detected by the respective sensor. The echo is characterized by the fact that a received amplitude of the sensor is above a limit value. The echo signals may contain a duration of the received echo and/or a received amplitude of the received echo in addition to the time of the received echo. The echo signals can also contain a plurality of echoes from objects in the environment detected by the respective sensor. The statements given above in relation to the received echo apply. No signal is generated for times in which no echoes are received, for example if a received amplitude is below a limit value. In addition, the sensors can generate envelopes containing the echo signals and transmit them to the control unit. The envelopes contain a temporal profile of the received amplitude and thus also contain amplitude values for intervals in which the received amplitude of the respective sensor is below the limit value, i.e. no echo is received by definition. The limit value can have a temporal profile because, for example, reflections from nearby objects are received with a greater amplitude than reflections from more distant but otherwise similar objects, due to dispersion.

By means of the common supply of the sensors, a simple wiring arrangement of the sensors can be implemented. In particular, by providing a common supply of the sensors via the control unit, the wiring can be implemented in accordance with a data connection from the control unit to the sensors, which is also required. Accordingly, a supply line can be laid parallel to the data line and thus preferably at the same time, or else only one wire is laid, which is used both as a supply line and as a data line.

The sensors mentioned may be ultrasonic sensors or radar sensors or others, for example. These sensors emit sensor signals and receive echo signals based on them, from which objects in the environment of the vehicle can be identified as echoes. Ultrasonic sensors thus emit ultrasonic pulses and receive ultrasonic echoes of the emitted ultrasonic pulses from the objects in the environment of the vehicle. In modern vehicles, it is common for a first group of sensors to be arranged along a front of the vehicle, and a second group of sensors to be arranged along a rear of the vehicle. Each group currently comprises four to six individual sensors. These sensors are therefore both arranged in a narrow spatial relationship and detect a contiguous portion of the environment of the vehicle. It is also becoming increasingly common to arrange ultrasonic sensors along the long sides of the vehicles, which sensors can also be connected to the control unit as independent groups, for the reasons mentioned.

For emitting the ultrasonic pulses, the ultrasonic sensors require a particularly high amount of energy, so that the substantially simultaneous emission of the ultrasonic pulses requires a large amount of electrical power to be provided. In order to reduce the required power, the sensors of the different groups therefore emit their sensor signals in groups with a temporal offset relative to other groups. After the emission of the ultrasonic pulses, the ultrasonic sensors receive the echo signals based on the reflections of the emitted sensor signals from objects in the environment of the vehicle. In order to be able to detect the reflections of the sensor signals at the objects as echoes in the echo signals, an electrical signal amplification of the received echo signals is required, because with increasing duration after the emission of the ultrasonic pulses, the amplitude of the received echo signals decreases sharply.

Errors in the reception of the echo signals can occur due to interference in the supply of the ultrasonic sensors. These errors can lead to incorrect detection of objects in the environment of the vehicle, i.e. to the false detection of non-existent objects, which, for example, can cause emergency braking systems to be erroneously activated. The interference can be caused by external influences or by the supply itself, for example in the control unit. In particular, if the control unit is required to provide a high power level, as is the case, for example, when emitting the sensor signals using the sensors of each group, so-called ripple currents can occur, wherein a DC voltage provided as a supply voltage is superimposed with alternating voltage components.

The problem of the electrical supply can be exacerbated with current sensors or driving assistance systems because the current sensors, compared to older sensors, emit the sensor signals over an extended period of time, in particular in the form of a plurality of individual signal pulses, which together form the sensor signal. This means that the sensors must be supplied with the required power for a longer period of time. In addition, the pulses lead to larger AC components in the supply. In order to avoid interference to the supply, in principle, various circuit-based solutions can be used, for example capacitors or ripple filters. However, these are associated with a great deal of effort and corresponding costs.

Based on the above-mentioned prior art, the object of the invention is therefore to specify a method for operating a sensor arrangement having a plurality of sensors as well as a corresponding sensor arrangement, which allow a simple and cost-effective detection of the environment without interference.

The object is achieved according to the invention by the features of the independent claims. Advantageous configurations of the invention are specified in the dependent claims.

According to the invention, a method is thus specified for operating a sensor arrangement having a control unit and a plurality of sensors which are arranged in at least one group, wherein the sensors are connected to a common electrical supply, in particular via the control unit, comprising the steps of emitting sensor signals using the sensors, wherein the sensors of each group emit their sensor signals in their respective group transmission phase, receiving echo signals based on reflections of the sensor signals, transmitting the received echo signals from the sensors to the control unit, and identifying interference in the received echo signals from the at least one group based on a comparison of at least two of the received echo signals from the corresponding group.

According to the invention, a method is also provided for operating a sensor arrangement with a control unit and a plurality of sensors which are arranged in at least two groups, wherein the sensors are connected to a common electrical supply, in particular via the control unit, comprising the steps of emitting sensor signals using the sensors, wherein the sensors of each group emit their sensor signals in their respective group transmission phase and the group transmission phases of the at least two groups are temporally offset, receiving echo signals based on reflections of the sensor signals, transmitting the received echo signals from the sensors to the control unit, and identifying interference in the received echo signals of each group based on the temporal offset of the group transmission phase and a duration of the group transmission phase of at least one other group.

According to the invention, a sensor arrangement for a vehicle is also specified, having a control unit and a plurality of sensors arranged in at least one group, wherein the sensors are connected to a common electrical supply, in particular via the control unit, and the sensor arrangement is designed for operation using the above method.

According to the invention, a sensor arrangement for a vehicle is additionally specified, having a control unit and a plurality of sensors arranged in at least one group, wherein the sensors are connected to a common electrical supply, in particular via the control unit, and the sensor arrangement is designed for operation according to the above method.

Also specified according to the invention is a driving assistance system for a vehicle having one of the above-mentioned sensor arrangements.

The basic idea of the present invention is therefore to identify instances of interference in the received echo signals, which arise from faults in the common supply, and thereby to be able to handle them appropriately. In particular, if the electrical supply, for example via the control unit, is required to operate at a high power level, as is the case, for example, when emitting the sensor signals using the sensors of the at least one group, so-called ripple currents can occur, wherein a DC voltage provided as a supply voltage is superimposed with alternating voltage components. If such interference caused by ripple currents can be reliably identified, it is possible to eliminate or ignore such interference in the echo signals, so that the control unit does not detect objects incorrectly. Thus, the interference can be cost-effectively overcome by improved signal processing of the received echo signals, resulting in reliable detection of objects in the environment of the vehicle and, in particular, avoiding false positives in the detection of objects in the environment of vehicles. Avoidance or elimination of such interference by means of circuit-based solutions such as capacitors or ripple filters as part of the provision of the common supply, for example in the control unit, can be achieved, which enables cost-effective handling of the interference. Also, using the sensors, the sensor signals can be transmitted over a longer period of time compared to previous implementations, in particular in the form of a plurality of individual signal pulses which together form the respective sensor signal, which means the sensors will require more power, or they require the same power over a longer period of time without the need to increase the power supply via the control unit. Interference that can be expected to occur over a longer period of time can be identified and overcome, so that the detection of objects in the environment of the vehicle can be carried out without significant restrictions. Depending on the method for operating the sensor arrangement, the interference can be individually identified for a single group of sensors, i.e. without knowledge of the operation of further groups of sensors. Alternatively, the interference is identified by a coordinated operation of multiple groups of sensors, as defined by the different group transmission phases.

The interference in the received echo signals of each group can be identified in different ways, which can be based on the emitted sensor signals as well as the received echo signals. In both cases, it is therefore not necessary to address the source of the fault directly, i.e. the supply, in order to identify or prevent the interference, the latter being associated with a great deal of effort.

The interference can therefore be identified on the one hand by comparing multiple instances of the received echo signals within the one group. This usually applies to simultaneously obtained echo signals in which faults in the common supply, which concerns the common supply of all sensors in the corresponding group, affect all sensors in the corresponding group due to interference effects in the reception of the echo signals. Depending on the design of the sensor arrangement with an arrangement of the sensors in a plurality of groups, effects of supply faults in the common supply of several of the groups can also occur in principle, depending on the type of operation and supply of the sensors of the different groups. In particular, the emission of sensor signals using the sensors of other groups can interfere with the supply of sensors of another group or other groups, so that the interference appears in the received echo signals of the corresponding group. Interference effects can be identified both in the supply of the sensors due to external influences, for example due to external interference signals, which are not foreseeable and/or can occur randomly, as well as due to interference from the operation of the supply of the sensors, for example in the control unit. The interference in the received echo signals of the at least one group can be identified in a fundamentally different way based on a comparison of at least two of the received echo signals from the corresponding group. Details have already been described above and are also given below. For example, the interference can be detected based on simultaneous echoes in the echo signals and/or echoes with excessive amplitudes and/or similar types of echoes in the echo signals.

On the other hand, the identification of the interference can be carried out by identifying, based on the group transmission phase of at least one other group, a corresponding time window of this group transmission phase as interference. In this case, no further investigations or comparisons of the received echo signals are necessary, and the interference can be identified with little effort. Identifying the interference based on the temporal offset and the duration of the group transmission phase of at least one other group may cause echo signals from the sensors of the group, which receives echo signals during the group transmission phase of another group, to be identified as interference during this group transmission phase. As a result, real echoes of objects in the environment of the vehicle cannot always be detected and processed. However, various measures described below are possible in order to be able to provide valid echo signals even within this time window. In this case, the interference effects in the corresponding group usually occur for all sensors included, because these sensors receive echo signals at the same time and have a common electrical supply. Similarly, interference effects in the common supply caused by interference in the reception of the echo signals affect all sensors in the corresponding group which are identified together based on the temporal offset of the group transmission phase and the duration of the group transmission phase. The group transmission phases in this case are controlled by the control unit so that the interference can be easily identified directly in the control unit. For example, the temporal offset relates to a start of the respective group transmission phases of the different groups. The temporal offset between the individual group transmission phases can be different, for example between different groups. The temporal offset can be selected such that the group transmission phases of the different groups do not overlap. In this case, the group transmission phases are each pairwise disjoint time intervals. The duration of the individual group transmission phases may vary for different groups. The duration of the group transmission phases of the different groups can in principle also be different in different cycles. The method is preferably repeated for the different groups. This can also produce interference for each of the groups of sensors based on an activity, in particular, the sending of the sensor signals, by the sensors of other groups. The temporal offset specifies a time point from which interference can start to occur based on the joint supply of a plurality of groups of sensors, and together with the duration of the corresponding group transmission phase(s), a time interval is defined as interference.

The interference in the reception of the echo signals typically relates to faults in the internal signal processing, i.e. from a physical coupling of the echo signal into the respective sensor, possibly up to the generation of an envelope of the respective echo signal. Due to the dispersion of the emitted sensor signals and the echo signals based on them, it is often necessary to perform signal processing, in particular signal amplification, of the physically coupled-in echo signal in order to reliably detect the reflections of the sensor signals as echo signals and to recognize echoes at the objects contained therein. For detecting echo signals from reflection of the sensor signals at distant objects, an increasingly higher electrical signal amplification, in particular signal gain, of the received echo signals is required, which increases with the duration after the emission of the sensor signals, i.e. with a distance of the objects from the respective sensor. By identifying the interference, the sensors can thus also reliably detect objects at greater distances from the respective sensor. This means, for example, that incorrect emergency braking operations by corresponding driving assistance systems can be avoided.

The sensor arrangement is typically part of a driving assistance system of a vehicle or is connected to the driving assistance system in order to provide this system with environmental information in relation to objects in the environment of the vehicle. The driving assistance system can be in principle any driving assistance system with one or more assistance functions. Such driving assistance systems are known, for example, as driver assistance systems to assist a human driver of the vehicle when driving the vehicle, for example, as an emergency braking system, adaptive cruise control system, parking assistance system, et cetera. However, such driving assistance systems can also provide functions that are used, for example, for autonomous or semi-autonomous driving of the vehicle.

The control unit is an inherently arbitrary computing unit that receives and processes the echo signals from the sensors. In the field of vehicles and driving assistance systems, such control units are known, for example, as ECUs (Electronic Control Unit). In principle, other components can also be connected to the control unit. If these additional components are connected to the common supply of the sensors and are supplied by them, this results in further potential sources of interference due to these further components being supplied via the common supply. The principles described here can be applied accordingly.

The sensor arrangement comprises a plurality of sensors, which are each preferably designed in the same way for each group. For example, the sensors can be ultrasonic sensors or radar sensors, which emit corresponding ultrasonic signals or radar signals as sensor signals and receive echo signals of these sensor signals as ultrasonic echoes or radar echoes. In modern vehicles, it is common for a first group of sensors, for example, to be arranged along a front of the vehicle, and a second group of sensors to be arranged along a rear of the vehicle. For example, each group comprises four to six individual sensors. In addition, groups of sensors can also be arranged along the long sides of the vehicles. The sensors are connected in parallel to the common supply, for example in the form of a supply line. Alternatively, the sensors of a group can be connected in the manner of a daisy chain and, in particular, connected to the control unit.

For example, the supply line may be laid parallel to one of the data lines and thus laid simultaneously, so that both lines are routed together. Alternatively, only one line may be laid, which is used both as a supply line and as a data line, i.e. the sensors and the control unit communicate via the common line, and the control unit supplies the sensors via the common line. The supply line comprises two potentials in the usual manner, typically a supply voltage and ground, which are provided via one or more individual electrical cables. Various bus systems are known as such, in which an integral configuration of the supply line and data line is implemented, for example DSI3 or USV11.

The common supply provides electrical energy to all connected sensors. When powered by the control unit, electrical power is supplied by the control unit. For example, the control unit has an internal or an external supply circuit to provide electrical energy for all groups via the supply lines. In vehicles, a voltage conversion can be carried out from an on-board vehicle voltage of typically 12 Volt to a desired supply voltage, in particular a voltage increase (boost).

The sensor signals are emitted for each group in the respective group transmission phase of the group, wherein in the group transmission phase these sensors typically emit their sensor signals in a close temporal relationship, in particular simultaneously, in order to receive the echo signals similarly either simultaneously or in a close temporal relationship. The echo signals are based on reflections of the sensor signals at objects in the environment of the vehicle, so that distances to the objects can be determined from a time difference between the emission of the sensor signals and the reception of echoes of the sensor signals at the objects. The echo signals thus specify both a temporal definition of received echoes and a definition of a distance of objects belonging to the echoes.

Typically, repeating cycles are formed in which the sensors of all groups emit their sensor signals and receive the echo signals and transmit them to the control unit. Accordingly, the sensors can emit sensor signals and receive the echo signals repeatedly. When the sensor signals are emitted simultaneously or almost simultaneously within each group, a high cycle repetition rate can be achieved to ensure continuous and almost immediate recording of the vehicle environment.

The received echo signals are transmitted from the sensors to the control unit jointly, in particular within the respective cycle, wherein for example, a time-delayed transmission of the echo signals from the individual sensors to the control unit can be carried out within a cycle. In principle, it is possible for the received echo signals to be transmitted from the sensors to the control unit in a cycle following the emission of the sensor signals in each case, in order to keep the cycles short. Similarly, echo signals from a current cycle can be received while the echo signal from the previous cycle is being transmitted from the corresponding sensor to the control unit. In principle, the echo signals from one cycle can also be transmitted to the control unit in the next following cycle or later.

In an advantageous embodiment of the method for operating a sensor arrangement having a plurality of sensors arranged in at least one group, the emission of sensor signals using the sensors, wherein the sensors of the at least one group emit their sensor signals in their respective group transmission phase, comprises emitting at least two different sensor signals from the sensors of the at least one group, the reception of echo signals based on reflections of the sensor signals comprises receiving at least two different echo signals based on reflections of the at least two different sensor signals, and the identification of interference in the received echo signals of the at least one group is based on a comparison of at least two different received echo signals. The different sensor signals are emitted by essentially identical sensors, but have at least one different feature, in particular with regard to a frequency of the sensor signal. For example, if ultrasonic sensors are used, sensor signals with different ultrasonic frequencies can be used. Only one type of sensor signals can be emitted by the sensors of each respective group, or at least some of the sensors of the respective group emit the different sensor signals in regular or random sequences. For example, current ultrasonic sensors can be operated with different frequencies in a range from approximately 45 kHz to 60 kHz. In particular, interference effects from ripple currents often have a nonuniform effect on the reception of the corresponding echo signals. Interference can therefore be identified, for example, from the fact that it occurs only for one frequency of the echo signals. The interference is therefore identified essentially on the basis of different echoes in the at least two different echo signals. This is true in particular if, based on a spatial proximity of the sensors that received the different echo signals, the same echoes are to be expected from real objects for each of the different sensor signals. Even when a plurality of the different echo signals is considered, a corresponding difference can be identified to detect interference. The same applies to radar sensors.

In an advantageous embodiment of the method for operating a sensor arrangement having a plurality of sensors arranged in at least one group, the emission of at least two different sensor signals with the sensors of the at least one group comprises emitting the at least two different sensor signals with different sensors of the at least one group. For example, different sensor signals can be emitted alternately from the ultrasonic sensors of the respective group according to their arrangement along the supply line. This allows reliable monitoring of the environment based on the different echo signals if the echo signals can be assigned to the different sensor signals. Mutual interference of the echo signals due to the different sensor signals is reduced.

In an advantageous embodiment of the method for operating a sensor arrangement having a plurality of sensors arranged in at least one group, the reception of at least two different echo signals based on reflections of the at least two different sensor signals comprises receiving the at least two different echo signals with at least one of the sensors of the at least one group. When different types of echo signals are received with one sensor, different sensor recordings can be made for the location of the corresponding sensor. This provides a reliable way to determine whether the echo signal is interference or whether an echo contained in it belongs to a real object. The emission of the different sensor signals is typically achieved with a plurality of sensors, in particular with adjacent sensors, in particular along a supply line. When the different echo signals are received with one sensor, in particular, an echo which occurs for only one type of echo signals can be identified as interference, since a real object should generate a corresponding echo for each of the different sensor signals for the location of the respective sensor.

In an advantageous embodiment of the method for operating a sensor arrangement having a plurality of sensors arranged in at least one group, the interference in the received echo signals of a group is identified based on a comparison of at least two received echo signals from two different sensors of the at least one group, in particular, from two sensors with differing arrangements. Interference in the common supply of a group affects all sensors in the group in the same way, so that interference in the supply caused by false echoes is noticeable in all sensors in the group. The false echoes are very similar or even identical in terms of time and amplitude. The interference can therefore be detected in the received echo signals of all sensors, wherein in principle only a partial examination of the received echo signals can be sufficient to detect the interference. Preferably, the different arrangement of the sensors relates to an arrangement at the beginning and end of the corresponding group of sensors, i.e. those sensors that are furthest apart are examined to identify the interference, since with these sensors a probability of simultaneous echoes from real objects is particularly low. Accordingly, interference can be identified particularly reliably.

In an advantageous embodiment of the method for operating a sensor arrangement having a plurality of sensors arranged in at least one group, the method comprises masking interference identified in the received echo signals of the at least one group, in particular in all received echo signals of the at least one group. The masking of the interference ensures that false positives in the detection of objects in the environment of the vehicle can be reliably avoided. It is sufficient if the interference is only identified in a portion of the echo signals received in order to mask the interference in the echo signals received from all sensors in the corresponding group. The masking of the interference directly affects the echo signals transmitted to the control unit synchronously, i.e. in the same cycle. The reception of the echo signals and the transmission of the received echo signals to the control unit can take place in different cycles.

In a further advantageous embodiment of the method for operating a sensor arrangement having a plurality of sensors arranged in at least one group, the masking of interference identified in the received echo signals of the at least one group comprises masking the identified interference when receiving further echo signals of the group. The further echo signals are transmitted from the sensors to the control unit at a later time, for example in a subsequent cycle. The further echo signals therefore relate to echo signals received at a later time. In the case of periodic interference signals, the masking can also be applied to signals other than the currently received echo signals, i.e. to future cycles. The expression "when receiving further echo signals" means that the interference in the currently received echo signals is not initially identified, but that the masking is also applied to the subsequently received echo signals of the group based on the previously identified interference. The masking is preferably carried out in the control unit, wherein the masking can take place immediately upon receipt of the echo signals or at a later time during processing of the echo signals.

In an advantageous embodiment of the method for operating a sensor arrangement having a plurality of sensors arranged in at least one group, the plurality of sensors of the sensor arrangement are arranged in at least two groups, wherein the sensors of each group emit their sensor signals in their respective group transmission phase, and the group transmission phases of the at least two groups are temporally offset, and the identification of interference in the received echo signals of the at least one group is based on a comparison of at least two received echo signals from the corresponding group, taking into account the temporal offset of the group transmission phases of other groups. For example, the temporal offset relates to a start of the respective group transmission phases of the different groups. The temporal offset between the individual group transmission phases can be different, for example for the different groups. In principle, the temporal offset can also be different in different cycles. The temporal offset can be selected such that the group transmission phases of the different groups do not overlap. In this case, the group transmission phases are each pairwise disjoint time intervals. The duration of the individual group transmission phases may vary for different groups. The duration of the group transmission phases of the different groups can in principle also be different in different cycles. The method is preferably carried out repeatedly for the different groups. This can also produce interference for each of the groups of sensors based on an activity, in particular, the sending of the sensor signals, by the sensors of other groups. Interference in the received echo signals can also be identified for each of the groups of sensors. If the temporal offset is known, it is therefore possible to search specifically for interference effects in the received echo signals in order to identify them. The temporal offset thus indicates a time at which interference can occur based on the common supply of multiple groups of sensors. Preferably, together with a known duration of the corresponding group transmission phase(s), a time interval is defined in which these interference effects can occur. For emitting the signal pulses, the sensors typically require a particularly large amount of energy, wherein the emission of the signal pulses in the group transmission phase of a corresponding group requires a large amount of electrical power to be provided for a short time. This can lead to increased interference in the received echo signals of the respective group during the group transmission phase(s) of other groups. After the signal pulses are emitted, the sensors receive the echo signals, which usually requires less electrical power to be provided and reduces the likelihood of interference occurring.

In an advantageous embodiment of the method for operating a sensor arrangement having a plurality of sensors arranged in at least one group, the method comprises varying the temporal offset between the group transmission phases of the at least two groups between two cycles to emit the sensor signals of the corresponding group. Changing the temporal offset between the group transmission phases of the at least two groups causes a time window in which the interference effects can occur to also shift. As a result, for example, when masking the interference in the received echo signals, one region can be masked, while in a subsequent envelope another region can be masked. Accordingly, given a suitable change in the temporal offset, the environment can be fully captured based on the two temporally offset echo signals received. Permanent masking of certain regions in the received echo signals can thus be avoided by varying the masking with the time offset. In particular in the case of low dynamics in the environment of the vehicle, i.e. when there are only slow movements of objects relative to the vehicle in the environment of the vehicle, the environment can be captured very reliably and completely with the sensors despite the masking, even in the event of periodically occurring interference signals.

In an advantageous embodiment of the method for operating a sensor arrangement having a plurality of sensors arranged in at least one group, the identification of interference in the received echo signals of the at least one group based on a comparison of at least two of the received echo signals from the corresponding group comprises identifying echoes in the received echo signals with the modified temporal offset over at least two cycles. This means that echo signals received from two or more cycles are examined to identify interference. Repeating echoes of objects in the received echo signals, that are essentially static with respect to the corresponding group transmission phases, can indicate interference. This means that, in particular in the case of high dynamics in the environment of the vehicle, i.e. rapid movements of objects relative to the vehicle in the environment of the vehicle, recurring echoes can be reliably identified as interference signals.

In an advantageous embodiment of the method for operating a sensor arrangement having a plurality of sensors arranged in at least one group, the emission of sensor signals using the sensors of each group in their respective group transmission phase comprises emitting the sensor signals from the sensors of each group in at least two sub-groups with a time interval between the emission of the sensor signals of the at least two sub-groups, and the identification of interference in the received echo signals of the at least one group based on a comparison of at least two of the received echo signals from the corresponding group comprises identifying echoes in the at least two received echo signals with the time interval. The sensor signals are usually emitted by the sensors of the at least two sub-groups with a short time interval, so that the corresponding group transmission phase is as short as possible. Preferably, the time interval is on the order of magnitude of the duration of the emission of the sensor signals. For example, the time interval can be a few milliseconds, for example three milliseconds or more, with an exemplary sensor signal having a duration of approximately 2.5 milliseconds. On the one hand, the use of at least two subgroups can reduce the maximum required power for the corresponding group of sensors, thereby reducing the risk of the occurrence of ripple currents. On the other hand, the emission of the sensor signals in at least two sub-groups with a time interval causes the resulting interference signals to exhibit characteristic echoes in the received echo signals, which can be easily and reliably detected in order to identify them as interference. The time interval relates, for example, to the start of transmission of the sensor signals of the sub-groups. The emission of the sensor signals of the sensors of the at least two sub-groups can in principle overlap in time. However, it is preferable to have no overlap in order to avoid power peaks due to the overlapping emission of the sensor signals with the sensors of the corresponding group. Preferably, inner and outer sensors each form a sub-group, i.e. sensors at the beginning and end of the supply line, which are usually also positioned on the vehicle accordingly.

In an advantageous embodiment of the method for operating a sensor arrangement having a plurality of sensors arranged in at least one group, the identification of interference in the received echo signals of the at least one group based on a comparison of at least two of the received echo signals from the corresponding group comprises identifying echoes in the at least two received echo signals with the temporal offset over at least two cycles. By emitting the sensor signals in at least two sub-groups with a time interval, repeating, characteristic echoes of objects in the received echo signals can indicate a recurring interference which can be identified particularly reliably. The identification of interference is facilitated by the characteristic echoes in the received echo signals.

In an advantageous embodiment of the method for operating a sensor arrangement having a plurality of sensors arranged in at least one group, the emission of the sensor signals from the sensors of each group in at least two sub-groups with a time interval between the emission of the sensor signals of the at least two sub-groups comprises modifying the time interval between two cycles for emitting in their respective group transmission phase comprises emitting the sensor signals of the corresponding group, and the identification of interference in the received echo signals of the at least one group based on a comparison of at least two of the received echo signals from the corresponding group comprises identifying echoes in the received echo signals with the modified time intervals over at least two cycles. By varying the time interval, an interference signal can be identified particularly reliably over at least two cycles, since the interference will also change with the variation in the time interval. A real object, on the other hand, will not change the shape of its echo in the received echo signals when the time interval changes, thus allowing interference to be reliably identified. The interference can therefore be recognized firstly by its shape and secondly by the change in correspondence with the change in the time interval.

In an advantageous embodiment of the method for operating a sensor arrangement having a plurality of sensors arranged in at least one group, the reception of echo signals based on reflections of the sensor signals comprises receiving envelopes with the received echo signals, the transmission of the received echo signals from the sensors to the control unit comprises transmitting the envelopes with the received echo signals, and the identification of interference in the received echo signals of the at least one group is based on a comparison of at least two envelopes with the respectively received echo signals of the corresponding group. The received echo signals are thus transmitted from the sensors to the control unit complete with their envelopes. An envelope curve is generated, for example, starting with the emission of the sensor signal or after a specified time interval. The end of the envelope is produced from the end of a reception time for receiving the reflections of the sensor signals. The envelope curve can be a continuous or a discrete envelope with a plurality of individual points that together define the envelope.

For the transmission of the envelopes containing the received echo signals, the above statements with regard to the transmission of the received echo signals apply mutatis mutandis.

In an advantageous embodiment of the method for operating a sensor arrangement having a plurality of sensors arranged in at least two groups, the method comprises varying the temporal offset between the group transmission phases of the at least two groups between two cycles to emit the sensor signals of the at least two groups. Varying the temporal offset between the group transmission phases of the at least two groups causes the interference effects also to occur in a temporally modified way. As a result, for example, when masking the interference in the received echo signals, one region can be masked, while in a subsequent envelope another region can be masked. Accordingly, given a suitable change in the temporal offset, the environment can be fully captured based on the two temporally offset echo signals received. Permanent masking of certain regions in the received echo signals can thus be avoided by varying the masking with the time offset. In particular in the case of low dynamics in the environment of the vehicle, i.e. when there are only slow movements of objects relative to the vehicle in the environment of the vehicle, the environment can be captured very reliably and completely with the sensors despite the masking, even in the event of periodically occurring interference signals.

In an advantageous embodiment of the method for operating a sensor arrangement having a plurality of sensors which are arranged in at least two groups, the identification of interference in the received echo signals of each group, based on the temporal offset of the group transmission phases and a duration of the group transmission phases of other groups, comprises identifying the interference in the received echo signals of each group based on a comparison of at least two of the received echo signals of the corresponding group. This means that the temporal offset and the duration of the group transmission phases specify a time window or time interval in which the interference signals are identified based on the comparison of the at least two of the received echo signals of the corresponding group. This enables a precise identification of interference signals by first limiting the occurrence of interference by the time window and then identifying interferences in this time window in a targeted manner. Regions outside this time window do not need to be examined for interference, which also allows the method to be performed very efficiently. With regard to the echo signals, reference is made to the above statements with regard to the method for operating a sensor arrangement having a plurality of sensors arranged in at least one group.

In an advantageous embodiment of the method for operating a sensor arrangement having a plurality of sensors arranged in at least two groups, the identification of the interference in the received echo signals of each group based on a comparison of at least two of the received echo signals from the corresponding group comprises identifying echoes in the received echo signals of each group with the modified temporal offset over at least two cycles. This means that echo signals received from two or more cycles are examined to identify interference. Repeating echoes of objects in the received echo signals, that are essentially static with respect to the corresponding group transmission phases, can indicate interference. This means that, in particular in the case of high dynamics in the environment of the vehicle, i.e. rapid movements of objects relative to the vehicle in the environment of the vehicle, recurring echoes, i.e. essentially static echoes, can be reliably identified as interference signals.

In an advantageous embodiment of the method for operating a sensor arrangement having a plurality of sensors arranged in at least two groups, the method comprises masking interference identified in the received echo signals of the at least two groups, in particular in all received echo signals of the at least two groups. The masking of the interference ensures that false positives in the detection of objects in the environment of the vehicle can be reliably avoided. The masking of the interference directly affects the echo signals transmitted to the control unit synchronously, i.e. in the same cycle. The reception of the echo signals and the transmission of the received echo signals to the control unit can take place in different cycles. In addition, the masking of interference identified in the received echo signals of the at least one group may comprise masking the identified interference when receiving further echo signals of the group. The further echo signals are transmitted from the sensors to the control unit at a later time, for example in a subsequent cycle. The further echo signals therefore relate to echo signals received at a later time. In the case of periodic interference signals, the masking can also be applied to signals other than the currently received echo signals, i.e. to future cycles. The expression "when receiving further echo signals" means that the interference in each of the currently received echo signals is not initially identified, but that the masking is also applied to the subsequently received echo signals of the group based on the previously identified interference. The masking is preferably carried out in the control unit, wherein the masking can take place immediately upon receipt of the echo signals or at a later time during processing of the echo signals.

In an advantageous embodiment of the method for operating a sensor arrangement having a plurality of sensors arranged in at least two groups, the reception of echo signals based on reflections of the sensor signals comprises receiving envelopes with the received echo signals, and the transmission of the received echo signals from the sensors to the control unit comprises transmitting the envelopes with the received echo signals. The received echo signals are thus transmitted from the sensors to the control unit as a whole with their envelopes. An envelope curve is generated, for example, starting with the emission of the sensor signal or after a specified time interval. The end of the envelope is produced from the end of a reception time for receiving the reflections of the sensor signals. The envelope curve can be a continuous or a discrete envelope with a plurality of individual points that jointly define the envelope. For the transmission of the envelopes containing the received echo signals, the above statements with regard to the transmission of the received echo signals apply mutatis mutandis.

The invention is explained in more detail below with reference to the attached drawing based on preferred embodiments. The features shown may each represent an aspect of the invention both individually and in combination. Features of different exemplary embodiments can be transferred from one exemplary embodiment to another.

Figure 2:
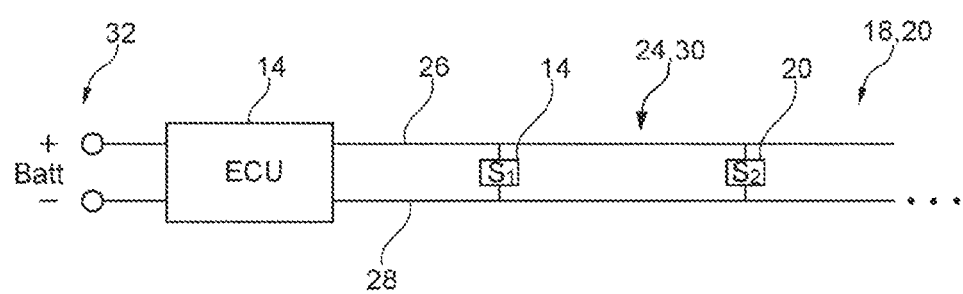
Figure 3:
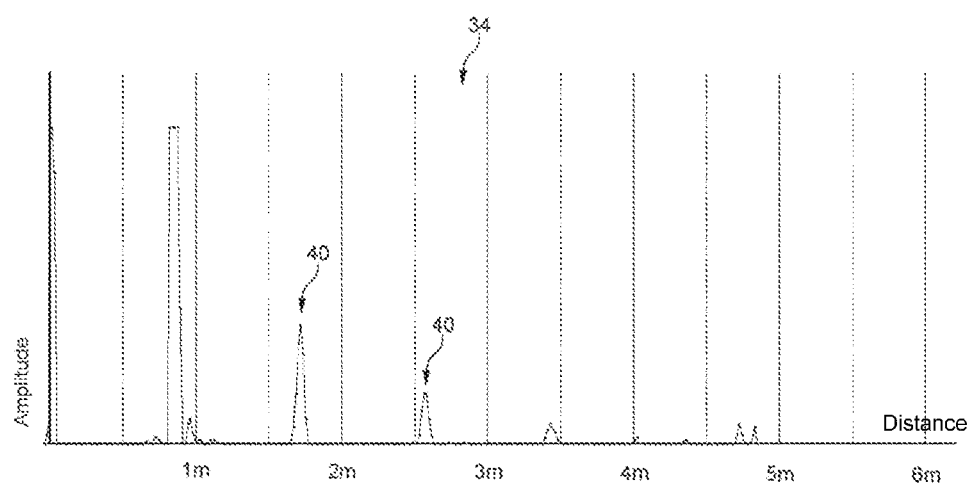
Figure 4:
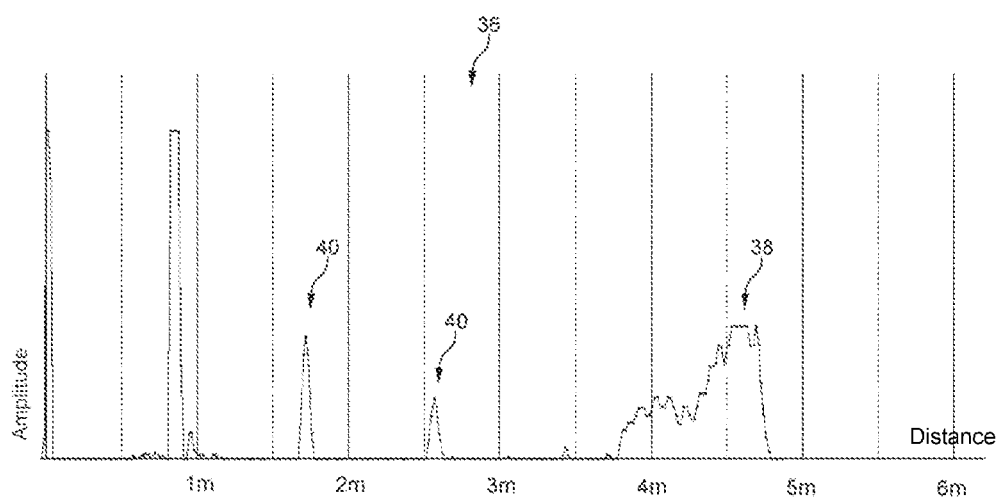
Figure 5:
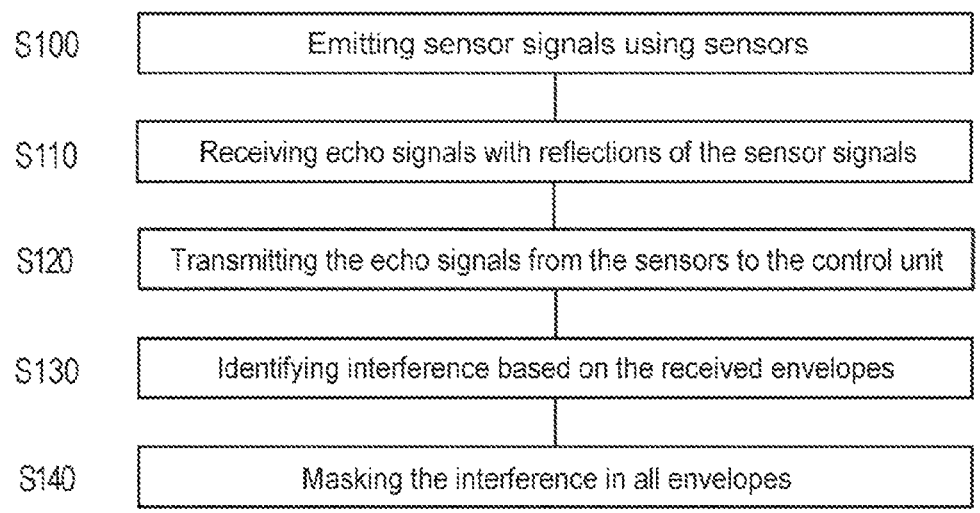
Figure 6:
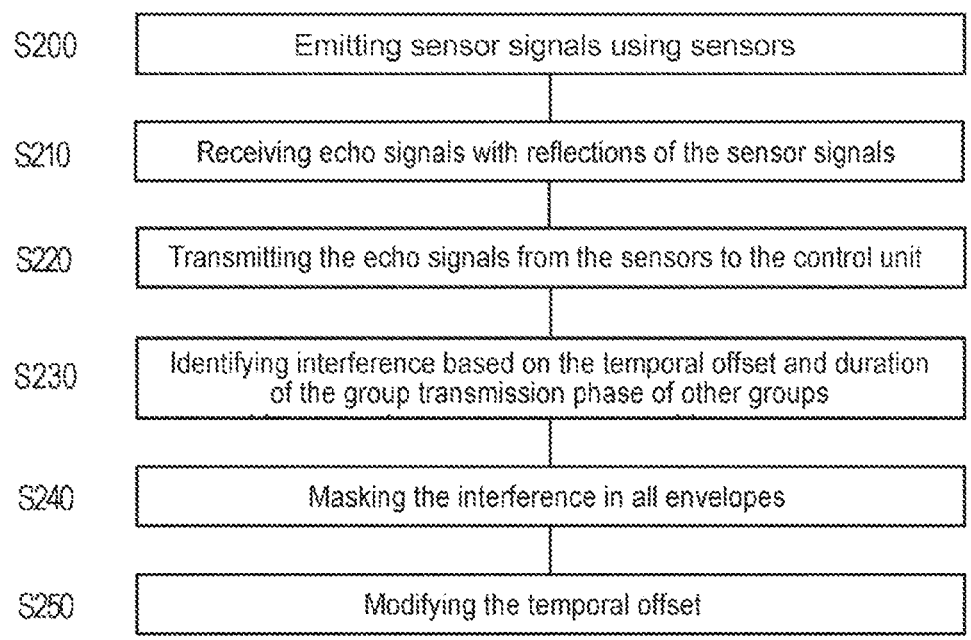

In the figures:

FIG. 1 shows a schematic view of a vehicle with a driving assistance system having a sensor arrangement according to a first, preferred embodiment, FIG. 2 shows a schematic representation of a part of the sensor arrangement from FIG. 1 with a control unit and a group of sensors, which are connected to each other via a supply line, FIG. 3 shows an exemplary representation of an envelope curve of an echo signal, which is transmitted from one of the sensors of the sensor arrangement via the supply line to the control unit, without interference, FIG. 4 shows an exemplary representation of an envelope curve of an echo signal, which is transmitted from one of the sensors of the sensor arrangement via the supply line to the control unit, with interference, FIG. 5 shows a flowchart of a method of a first embodiment for operating the sensor arrangement of the first embodiment, and FIG. 6 shows a flowchart of a method of a third embodiment for operating the sensor arrangement of the first or second embodiment.

FIG. 1 shows a vehicle 10 with a driving assistance system according to a first, preferred embodiment.

The driving assistance system can be in principle any driving assistance system with one or more assistance functions. The driving assistance system can be designed as a driver assistance system to assist a human driver of the vehicle 10 in driving the vehicle 10, for example as an emergency braking system, adaptive cruise control system, parking assistance system et cetera. Alternatively or in addition, the driving assistance system may provide functions that are used for autonomous or semi-autonomous driving of the vehicle 10.

The driving assistance system has a sensor arrangement 12. The sensor arrangement 12 comprises a control unit 14 and a plurality of sensors 16. The control unit 14 is any arbitrary computing unit. In the field of vehicles 10 and driving assistance systems, such control units 14 are known, for example, as ECUs (Electronic Control Unit).

The plurality of sensors 16 are arranged in two groups 18, 20 on the vehicle 10. In this exemplary embodiment, the sensors 16 are configured as ultrasonic sensors 16. All sensors 16 here are designed in the same way. A first group 18 with sensors 16 is arranged along a front of the vehicle 10, and a second group 20 with sensors 16 is arranged along a rear of the vehicle 10. Each of the two groups 18, 20 is illustrated in FIG. 1 with five individual sensors 16 as an example. The sensors 16 implement a monitoring of an environment 22 of the vehicle 10 by detecting objects in the environment 22 of the vehicle 10.

The sensors 16 of each of the two groups 18, 20 are connected in parallel to a supply line 24, which is formed by two individual wires 26, 28 in each case. Each of the two groups 18, 20 with sensors 16 is connected to the control unit 14 via a separate supply line 24. The sensors 16 of both groups 18, 20 receive a common electrical supply from the control unit 14 via the corresponding supply lines 24.

The supply line 24 is used here simultaneously as a data line 30, i.e. the sensors 16 and the control unit 14 communicate via the supply line 24. Various bus systems are known as such, in which an integral configuration of supply line 24 and data line 30 is implemented, for example DSI3 or USV11. An excerpt of the sensor arrangement 12 is illustrated in detail in FIG. 2 with the supply line 24 and data line 30. An alternative embodiment of the supply line 24 with the data line 30 is also possible.

The control unit 14 is connected to a battery 32 of the vehicle 10, from which it receives electrical energy for supplying the sensors 16 of the two groups 18, 20 via the corresponding supply lines 24.

A method shown in FIG. 5 for operating the sensor arrangement 12 of the first embodiment is explained below. The order of the steps specified in the described method can be partly modified or some of the steps are optional, as will be obvious to a person skilled in the art.

The method begins with step S100, which involves emitting sensor signals using the sensors 16. The ultrasonic sensors 16 emit ultrasonic pulses or ultrasonic pulse sequences as sensor signals. The ultrasonic sensors 16 of each group 18, 20 emit their sensor signals simultaneously in a common group transmission phase. In the process, two different sensor signals are emitted by the ultrasonic sensors 16 of each group 18, 20, namely ultrasonic signals with a high ultrasonic frequency and ultrasonic signals with a low ultrasonic frequency in a frequency range for ultrasonic signals of approximately 45 kHz to 60 KHz.

The ultrasonic sensors 16 of the respective group 18, 20 emit the two different sensor signals alternately according to their arrangement along the supply line 24.

Step S110 relates to receiving echo signals based on reflections of the sensor signals. The echo signals are received based on reflections of the sensor signals emitted in step S100. Accordingly, two different echo signals based on the reflections of the two different sensor signals are received by the ultrasonic sensors 16 of each of the groups 18, 20. Each of the ultrasonic sensors 16 simultaneously receives echo signals for both ultrasonic frequencies of the emitted ultrasonic signals, i.e. each ultrasonic sensor 16 receives on two frequency channels.

In this case, the ultrasonic sensors 16 receive envelopes 34, 36 with the received echo signals. Examples of corresponding envelopes 34, 36 are shown in FIGS. 3 and 4.

The reflections of the sensor signals occur at objects in the environment 22 of the vehicle 10, so that distances to the objects can be determined in the control unit 14 from a time difference between the emission of the sensor signals and the reception of the echo signals.

Step S120 relates to a transmission of the envelopes 34, 36 with the received echo signals from the sensors 16 to the control unit 14. Each envelope 34, 36 in this exemplary embodiment comprises, by way of example, a complete period of time from the emission of the sensor signal to the end of a reception time for receiving the reflections of the sensor signals. The envelope 34, 36 can be a continuous or a discrete envelope 34, 36 with a plurality of individual points, which together define the envelope 34, 36. The envelopes 34, 36 are transmitted jointly with the echo signals received from the sensors 16 to the control unit 14, wherein the transmission of the envelopes 34, 36 from the individual sensors 16 is time-shifted. In addition, the envelopes 34, 36 are transmitted from the sensors 16 to the control unit 14 in a cycle that follows the emission of the sensor signals in each case.

Step S130 relates to identifying interference 38 in the envelopes 34, 36 of the received echo signals of each group 18, 20 based on a comparison of the envelopes 34, 36 of the received echo signals from the corresponding group 18, 20.

First, the interference 38 is identified in the envelopes 34, 36 of the received echo signals of a group 18, 20 based on a comparison of the envelopes 34, 36 of a plurality of sensors 16 of the group 18, 20 for the same frequency channel in each case. As can be seen from FIG. 3, the envelope 34 shown there has no interference 38. The envelope 34 of FIG. 3 contains multiple echoes 40 of objects in the environment 22 of the vehicle 10.

In contrast, the envelope 36 of FIG. 4 shows, in addition to the echoes 40, which are also shown in FIG. 3, an interference signal 38, which appears in a similar manner in the envelopes 34, 36 of all sensors 16 for the same frequency channel, which means that the interference 38 in the examined envelopes 34, 36 is similar or even identical in terms of time or distance and amplitude for the corresponding frequency channel. Thus if the interference 38 is visible for the same frequency channel for all sensors 16, the interference 38 is detected as such.

In addition, interference 38 is identified by comparing the respective two envelopes 34, 36 for each of the ultrasonic sensors 16 based on the two different echo signals, i.e. the envelopes 34, 36 of the two received frequency channels are compared with each other for each of the sensors 16. The interference 38 may—for example, depending on the type of interference 38—be visible in only one of the frequency channels, i.e. the envelope 34, 36 of a frequency channel is, as shown in FIG. 3, without detectable interference 38, and the envelope 34, 36 of the other frequency channel, as shown in FIG. 4, shows a detectable interference 38. The interference 38 is identified by the fact that the one frequency channel shows interference 38 and the other frequency channel does not.

Step S140 involves masking the identified interference 38 in all envelopes 34, 36 of the received echo signals of each of the groups 18, 20. As a result, the interference 38 is masked in the envelopes 34, 36, so that no false positive detections of objects occur in the environment 22 of the vehicle 10. Depending on the type of interference 38, the masking can affect the envelopes 34, 36 of only one frequency channel or both frequency channels.

In this exemplary embodiment, the method is carried out repetitively in cycles, wherein a cycle for the sensors 16 comprises steps S100 to S120. The repeating method in a general form also comprises steps S130 and S140.

The following text describes the second embodiment, which is based on the sensor arrangement 12 and the method of the first embodiment. Accordingly, differences between the two embodiments are described. Features of the second embodiment not described in detail correspond, in case of doubt, to those of the first embodiment.

The method of the second embodiment is carried out with the sensor arrangement 12 of the second embodiment, wherein the sensor arrangement 12 of the second embodiment has the same structure as the sensor arrangement 12 of the first embodiment.

Contrary to the method of the first embodiment, step S100 comprises emitting sensor signals using the sensors 16, wherein the sensors 16 of each group 18, 20 emit their sensor signals in their respective group transmission phase, and the group transmission phases of the two groups 18, 20 are temporally offset. The temporal offset is chosen such that the group transmission phases of the different groups 18, 20 do not overlap. In this case, the group transmission phases are disjoint time intervals.

In contrast to the method of the first embodiment, step S130 comprises the identification of interference 38 in the envelopes 34, 36 of the received echo signals of a respective group 18, 20 taking into account the temporal offset of the group transmission phases. Based on the known temporal offset together with the duration of the corresponding group transmission phase(s), which is also known, a time interval is obtained in which interference signals 38 can occur in the supply, namely interference signals caused by the emission of the echo signals of the respective other group 18, 20. Therefore, the identification of interference 38 in the envelopes 34, 36 of the received echo signals of a group 18, 20 takes place for exactly these time ranges. The result is a time interval in which these interference signals 38 can occur. In this time interval, the control unit 14 specifically searches for the interference signals 38 based on the supply in the envelopes 34, 36 during the transmission of the sensor signals, in order to easily identify them.

In this exemplary embodiment also, the method is carried out repetitively in cycles, wherein a cycle for the sensors 16 comprises steps S100 to S120. The cycles of the two groups 18, 20 are offset relative to each other by the temporal offset.

The following text describes a method shown in FIG. 6 according to a third embodiment for operating the sensor arrangement 12 of the first embodiment. The order of the steps specified in the described method can be partly modified or some of the steps are optional, as will be obvious to a person skilled in the art. In principle, the method can also be carried out in the same way using the sensor arrangement 12 of the second embodiment.

The method of the third embodiment partially corresponds to the method of the first embodiment. Accordingly, differences between the two embodiments are described. Features of the third embodiment not described in detail correspond, in case of doubt, to those of the first embodiment.

The method begins with step S200, which involves emitting sensor signals using the sensors 16. Step S200 essentially corresponds to step S100 of the method of the first embodiment.

Step S210 relates to receiving echo signals based on reflections of the sensor signals. Step S210 corresponds to step S110 of the method of the first embodiment.

Step S220 relates to a transmission of the envelopes 34, 36 with the received echo signals from the sensors 16 to the control unit 14. Step S220 corresponds to step S120 of the method of the first embodiment.

Step S230 relates to identifying interference 38 in the received envelopes 34, 36 of each group 18, 20 based on the temporal offset of the group transmission phase and a duration of the group transmission phase of at least one other group 18, 20. The group transmission phase of the first group 18 is identified as interference in the envelopes 34, 36 of the sensors 16 of the second group 20, and the group transmission phase of the second group 20 is identified as interference in the envelopes 34, 36 of the sensors 16 of the first group 18. The interference is identified for all sensors 16 of the corresponding group 18, 20.

Step S240 involves masking the identified interference 38 in all envelopes 34, 36 of the received echo signals of each of the groups 18, 20. Step S240 corresponds to step S140 of the method of the first embodiment.

Step S250 relates to modifying the temporal offset between the group transmission phases of the two groups 18, 20 between two cycles for emitting the sensor signals of the two groups 18, 20.

The method of the third embodiment is carried out here repetitively in cycles, wherein a cycle for the sensors 16 comprises steps S200 to S220. The repeating method in a general form additionally comprises steps S230 to S250.

LIST OF REFERENCE SIGNS 10 vehicle
12 sensor arrangement
14 control unit
16 sensor, ultrasonic sensor
18 first group
20 second group
22 environment
24 supply line
26 wire
28 wire
30 data line
32 battery
34 envelope without interference, channel 1
36 envelope with interference, channel 2
38 interference
40 echo

The invention claimed is:

1. A method for operating a sensor arrangement having a control unit and a plurality of sensors, which are arranged in at least one group, wherein the sensors are connected to a common electrical supply, in particular via the control unit, the method comprising:
emitting sensor signals using the sensors, wherein the sensors of each group emit their sensor signals in their respective group transmission phase;
receiving echo signals based on reflections of the sensor signals;
transmitting the received echo signals from the sensors to the control unit; and
identifying interference in the received echo signals from the at least one group based on a comparison of at least two of the received echo signals from the corresponding group.

2. The method as claimed in claim 1, wherein
the emission of sensor signals using the sensors, wherein the sensors of the at least one group emit their sensor signals in their respective group transmission phase, comprises emitting at least two different sensor signals using the sensors of the at least one group,
the reception of echo signals based on reflections of the sensor signals comprises receiving at least two different echo signals based on reflections of the at least two different sensor signals, and
the identification of interference in the received echo signals from the at least one group is based on a comparison of at least two different received echo signals.

3. The method as claimed in claim 2, wherein the emission of at least two different sensor signals using the sensors of the at least one group comprises emitting the at least two different sensor signals using different sensors of the at least one group.

4. The method as claimed in either of claim 2, wherein the reception of at least two different echo signals based on reflections of the at least two different sensor signals comprises receiving the at least two different echo signals using at least one of the sensors of the at least one group.

5. The method as claimed in claim 1, wherein the identification of interference in the received echo signals of a group is based on a comparison of at least two received echo signals from two different sensors of the at least one group, wherein from two sensors with different arrangements.

6. The method as claimed in claim 1, wherein the method comprises masking an identified interference in the received echo signals of the at least one group in all received echo signals of the at least one group.

7. The method as claimed in claim 1, wherein the plurality of sensors of the sensor arrangement are arranged in at least two groups, wherein the sensors of each group emit their sensor signals in their respective group transmission phase, and the group transmission phases of the at least two groups are temporally offset, and the identification of interference in the received echo signals of the at least one group is based on a comparison of at least two of the received echo signals from the corresponding group, taking into account the temporal offset of the group transmission phases of other groups.

8. The method as claimed in claim 7, wherein the method comprises modifying the temporal offset between the group transmission phases of the at least two groups between two cycles for emitting the sensor signals of the corresponding group.

9. The method as claimed in claim 8, wherein the identification of interference in the received echo signals of the at least one group based on a comparison of at least two of the received echo signals from the corresponding group comprises identifying echoes in the received echo signals with the modified temporal offset over at least two cycles.

10. The method as claimed in claim 1, wherein:
the emission of sensor signals with the sensors of each group in their respective group transmission phase comprises emitting the sensor signals from the sensors of each group in at least two sub-groups with a time interval between the emission of the sensor signals of the at least two sub-groups, and
the identification of interference in the received echo signals of the at least one group based on a comparison of at least two of the received echo signals from the corresponding group comprises identifying echoes in the at least two received echo signals with the time interval.

11. The method as claimed in claim 10, wherein the identification of interference in the received echo signals of the at least one group based on a comparison of at least two of the received echo signals from the corresponding group comprises identifying echoes in the at least two received echo signals with the time interval over at least two cycles.

12. The method as claimed in preceding claim 11, wherein:
the emission of the sensor signals from the sensors of each group in at least two subgroups with a time interval between the emission of the sensor signals of the at least two sub-groups comprises changing the time interval between two cycles for emitting the sensor signals of the corresponding group, and
the identification of interference in the received echo signals of the at least one group based on a comparison of at least two of the received echo signals from the corresponding group comprises identifying echoes in the received echo signals with the modified time intervals over at least two cycles.

13. The method as claimed in claim 1, wherein:
receiving echo signals based on reflections of the sensor signals comprises receiving envelopes with the received echo signals, the transmission of the received echo signals from the sensors to the control unit comprises transmitting the envelopes with the received echo signals, and
the identification of interference in the received echo signals from the at least one group is based on a comparison of at least two envelopes with the echo signals received from the corresponding group in each case.

14. A method for operating a sensor arrangement having a control unit and a plurality of sensors, which are arranged in at least two groups, wherein the sensors are connected to a common electrical supply, in particular via the control unit, comprising:
emitting sensor signals using the sensors, wherein the sensors of each group emit their sensor signals in their respective group transmission phase, and the group transmission phases of the at least two groups are temporally offset;
receiving echo signals based on reflections of the sensor signals;
transmitting the received echo signals from the sensors to the control unit; and
identifying interference in the received echo signals of each group is based on the temporal offset of the group transmission phase and a duration of the group transmission phase of at least one other group.

15. The method as claimed in claim 14, wherein the method comprises modifying the temporal offset between the group transmission phases of the at least two groups between two cycles for emitting the sensor signals of the at least two groups.

16. The method as claimed in claim 15, wherein the identification of interference in the received echo signals of each group, based on the temporal offset of the group transmission phases and a duration of the group transmission phases of other groups, comprises identifying the interference in the received echo signals of each group based on a comparison of at least two of the received echo signals of the corresponding group.

17. The method as claimed in claim 16, wherein the identification of the interference in the received echo signals of each group based on a comparison of at least two of the received echo signals of the corresponding group comprises identifying echoes in the received echo signals from each group with the modified temporal offset over at least two cycles.

18. The method as claimed in claim 14, further comprising: masking an identified interference in the received echo signals of the at least two groups in all received echo signals of the at least two groups.

19. The method as claimed in claim 14, wherein receiving echo signals based on reflections of the sensor signals comprises receiving envelopes with the received echo signals, and the transmission of the received echo signals from the sensors to the control unit comprises transmitting the envelopes with the received echo signals.

20. A sensor arrangement for a vehicle having:
a control unit; and
a plurality of sensors arranged in at least one group,
wherein the sensors are connected to a common electrical supply via the control unit,
wherein the sensor arrangement is designed for operating according to the method as claimed in claim 1.

21. A sensor arrangement for a vehicle having:
a control unit; and
a plurality of sensors arranged in at least two groups,
wherein the sensors are connected to a common electrical supply via the control unit,
wherein the sensor arrangement is designed for operating according to the method as claimed in claim 14.

22. A driving assistance system for a vehicle having a sensor arrangement as claimed in claim 20.

* * * * *